(12) United States Patent
Slack (10) Patent No.: US 10,281,301 B2
(45) Date of Patent: May 7, 2019

(54) REFERENCE MARK DETECTOR ARRANGEMENT

(71) Applicant: RENISHAW PLC, Wotton-under-Edge, Gloucestershire (GB)

(72) Inventor: Jason Kempton Slack, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 367 days.

(21) Appl. No.: 15/024,507

(22) PCT Filed: Sep. 26, 2014

(86) PCT No.: PCT/EP2014/070614
§ 371 (c)(1),
(2) Date: Mar. 24, 2016

(87) PCT Pub. No.: WO2015/049173
PCT Pub. Date: Apr. 9, 2015

(65) Prior Publication Data
US 2016/0231144 A1    Aug. 11, 2016

(30) Foreign Application Priority Data
Oct. 1, 2013 (EP) .................................... 13275237

(51) Int. Cl.
*G01D 5/38* (2006.01)
*G01D 5/347* (2006.01)
*G01D 5/36* (2006.01)

(52) U.S. Cl.
CPC ........... *G01D 5/38* (2013.01); *G01D 5/34715* (2013.01); *G01D 5/34746* (2013.01); *G01D 5/366* (2013.01)

(58) Field of Classification Search
CPC .. G01D 5/38; G01D 5/34715; G01D 5/34746; G01D 5/366
See application file for complete search history.

(56) References Cited

U.S. PATENT DOCUMENTS 5,026,985 A    6/1991   Ishizuka et al.
5,569,913 A    10/1996  Ishizuka et al.
(Continued)

FOREIGN PATENT DOCUMENTS

CN    1882823 A     12/2006
EP    1045227 B1    1/2007
(Continued)

OTHER PUBLICATIONS

"Annotated Photograph Believed to Depict Canon SR Encoder Sold At Least Before 2012".
(Continued)

*Primary Examiner* — Georgia Y Epps
*Assistant Examiner* — Don J Williams
(74) *Attorney, Agent, or Firm* — Oliff PLC (57) ABSTRACT

An encoder apparatus comprising a scale comprising scale features in at least one track which define a series of incremental scale marks and at least one reference mark and a readhead comprising a light source, a diffraction grating, an incremental photodetector and a reference photodetector comprising at least two detector channels. The features defining the at least one reference mark are configured such that the at least one reference mark as resolvable by each of the at least two detector channels comprises a single feature. The optical arrangement of the encoder is such that a non-imaged representation of at least the track in which the at least one reference mark is contained falls onto the detector.

18 Claims, 10 Drawing Sheets

(56) References Cited

U.S. PATENT DOCUMENTS

| | | |
|---|---|---|
| 5,651,187 A | 7/1997 | Affa |
| 5,861,953 A | 1/1999 | Henshaw |
| 5,956,140 A | 9/1999 | Ishizuka et al. |
| 6,472,658 B2 | 10/2002 | Mayer et al. |
| 6,541,761 B1 | 4/2003 | Holzapfel et al. |
| 6,605,828 B1 | 8/2003 | Schwarzrock et al. |
| 7,285,769 B2 | 10/2007 | Oka et al. |
| 7,289,042 B2 | 10/2007 | Gordon-Ingram |
| 7,538,313 B2 | 5/2009 | Oka et al. |
| 7,624,513 B2 | 12/2009 | Howley |
| 7,659,992 B2 | 2/2010 | McMurtry et al. |
| 2002/0011559 A1 | 1/2002 | Mayer et al. |
| 2004/0036016 A1* | 2/2004 | Homer ............ G01D 5/366 250/231.13 |
| 2006/0267822 A1 | 11/2006 | Ito |
| 2012/0292493 A1* | 11/2012 | Hermann ......... G01D 5/366 250/231.1 |

FOREIGN PATENT DOCUMENTS

| | | |
|---|---|---|
| JP | S62-172219 A | 7/1987 |
| JP | H03-115920 A | 5/1991 |
| JP | H8-101009 A | 4/1996 |
| JP | H8-226804 A | 9/1996 |
| JP | H8-304118 A | 11/1996 |
| JP | H10-332431 A | 12/1998 |
| JP | 2001-356028 A | 12/2001 |
| JP | 2004-85475 A | 3/2004 |
| JP | 2005-326266 A | 11/2005 |
| JP | 2006-71535 A | 3/2006 |
| JP | 2010-223636 A | 10/2010 |
| WO | 02/065061 A1 | 8/2002 |
| WO | 2005/124282 A2 | 12/2005 |
| WO | 2010/139964 A2 | 12/2010 |
| WO | 2012/052981 A2 | 4/2012 |

OTHER PUBLICATIONS

"Annotated Diagram of Renishaw's RG1 Head Sold At Least Before 2012".

"Annotated Photograph of Renishaw's TONiC Readhead Sold At Least Before 2012".

"Ultra Miniature Optical Encoder SR Series," Canon U.S.A., Inc. (Jan. 2011).

"Red Point Source LED Chip MED7P4," Daido Steel Co., Ltd. (Mar. 2009).

"Optoelektronische Sensoren für die Weg- und Winkelmessung," Reiner Burgschat, published before 2012.

Mar. 14, 2014 Search Report issued in European Patent Application No. 13275237.

Jan. 28, 2015 Search Report issued in International Patent Application No. PCT/EP2014/070614.

Jan. 28, 2015 Written Opinion issued in International Patent Application No. PCT/EP2014/070614.

Jun. 26, 2017 Office Action issued in Chinese Application No. 201480065636.2.

Human Translation of JP 2006-71535 A.

Human Translation of JP H08-304118 A.

Jul. 17, 2018 Office Action issued in Japanese Application No. 2016-519750.

Apr. 26, 2018 Office Action issued in Chinese Application No. 201480065636.2.

* cited by examiner

REFERENCE MARK DETECTOR ARRANGEMENT

The present invention relates to a measurement encoder. As will be understood, a measurement encoder typically comprises a scale comprising features and a readhead for reading the features so as to be able to determine relative position of the readhead and scale. The scale and readhead are moveable relative to each other.

As will be understood, a measurement encoder typically comprises a scale comprising features and a readhead for reading the features so as to be able to determine relative position of the readhead and scale. The scale and readhead are moveable relative to each other.

Incremental encoders are known wherein the scale comprises a series of incremental features which the readhead can read to determine and measure relative motion. As will be understood, various techniques can be used to read the incremental features, including simple imaging of the incremental features and counting the features as they pass the readhead.

Many incremental encoders rely on the use of a combination of gratings arranged to diffract light so as to produce optical patterns at a detector which changes as the readhead and scale move relative to each other. Examples of a typical incremental encoder produced by Renishaw plc are available under the brand names TONiC™ and SiGNUM™. In the TONiC™ and SiGNUM™ readheads a lens is used to substantially collimate light from the source. They also comprise a diffraction grating (which is a phase grating), and a photodetector array. In operation, collimated light from the light source interacts with the scale (which is an amplitude grating) to produce diffraction orders, which in turn interact with the diffraction grating to produce at the photodetector array an interference fringe pattern which moves with relative movement of the scale and readhead. The TONiC™ and SiGNUM™ encoders are what are commonly referred to as two-grating encoders in that the light from the source in the readhead is diffracted by two gratings (in this case the first being the scale and the second a diffraction grating within the readhead) to produce an interference fringe at a photodetector array. This type of encoder is described in more detail in U.S. Pat. No. 7,659,992.

Often, one or more reference marks are provided (e.g. embedded within or next to the series of incremental features) which are distinguishable from the series of substantially periodic features, such that relative position can be determined with respect to known reference positions defined by the reference marks. For example, reference marks can be used to provide an absolute reference position, e.g. from which the incremental position can be "counted". Such reference marks need to be detected and so a readhead typically comprises a reference mark detector. Additionally, a lens or mask is typically used to facilitate detection of the reference mark. For example, in U.S. Pat. No. 7,659,992 a lens is used to image the reference mark onto the detector. In WO02/065061 a mask is used to facilitate detection of the reference mark having a correlating pattern, or a structured light detector having an arrangement corresponding to that of the reference mark is provided, so that at alignment of the reference mark with the mask or structured light detector, a peak or trough of light is received at the detector indicating the presence of the reference mark.

So-called "shadow-cast" encoders are known in which a shadow of the scale (i.e. the incremental/asbo lute scale features and any reference mark feature) is projected onto the readhead's detector(s), the detector(s) detecting the shadow so as to determine relative position information. As will be understood, such shadows can be created by the features of the scale reducing the amount of light reaching the detector, which can be achieved in many ways, such as blocking, absorbing and/or scattering the light from the source, such that what falls on the detector is a non-imaged representation of the scale on the detector(s). As will be understood, such shadow-cast encoders are different from other types of encoders in which, for example a lens is used to image at least part of the scale on the detector (e.g. as described in U.S. Pat. No. 7,659,992 and in WO2010/139964) or in which a mask is used to facilitate detection of the reference mark having a correlating pattern (e.g. as described in WO02/065061). Although in these other types of encoder the scale has features which block, absorb and/or scatter light, they do not cast a shadow that is seen and detected by the detector to determine the presence of the reference mark; rather the detector sees/detects an image of the features (as in U.S. Pat. No. 7,659,992), or sees/detects a bright peak or dark trough caused by the correlation of the reference mark with the mask (as in WO02/065061).

Our inventors wanted to provide an improved, and in particular a more compact grating-based incremental, optical encoder.

This invention provides an incremental encoder having at least one reference mark, in which the incremental position is determined via a diffraction-based arrangement, and in which a shadow-cast arrangement of at least the track in which the reference mark is contained is provided for detecting the reference mark. In other words, this invention provides an incremental encoder having at least one reference mark, in which the incremental position is determined via a diffraction-based arrangement, and in which a non-imaged representation of at least the track in which the reference mark is contained falls on the reference mark detector such that a reference position can be determined.

In other words, there is provided an encoder apparatus comprising: a scale comprising scale features which define a series of incremental scale marks and a reference mark; a readhead comprising a light source, a diffraction grating, an incremental photodetector and a reference photodetector comprising at least two detector channels, the features defining the reference mark being configured such that the reference mark, as seen by the at least two detector channels, comprises a single resolvable feature. The encoder apparatus is configured such that the scale's features that define the reference mark reduce the intensity of light emanating from the source reaching the reference photodetector such that a shadow of at least the scale's features that define the reference mark is thereby cast on the reference photodetector. In other words a shadow-cast arrangement of at least the track in which the reference mark is contained is provided for detecting the reference mark. That is a shadow, or shadow-like replication of the scale, falls on the reference photodetector.

According to a first aspect of the invention there is provided an encoder apparatus comprising: a scale comprising scale features in at least one track, which define a series of incremental scale marks and a reference mark (defining a reference position); a readhead comprising a light source, a diffraction grating, an incremental photodetector and a reference photodetector comprising at least two detector channels, the features defining the reference mark being configured such that the reference mark as resolvable by each of the at least two detector channels comprises a single feature, in which the optical arrangement of the encoder is such that a non-imaged representation of at least the track in which the reference mark is contained falls on the reference photodetector (as the readhead passes the reference position).

Accordingly, the readhead can be without a lens that forms an image of the track containing the reference mark on the reference photodetector. Obtaining a representation of the track containing the reference mark without the use of imaging optics, i.e. without lens(es) used to form an image on the detector, can be advantageous as it can enable the compactness of the encoder apparatus, in particular the readhead to be significantly improved. It can also avoid the need for careful alignment of a lens to the reference photodetector.

The encoder apparatus can be configured to identify the reference mark by analysing the output from the reference photodetector. The readhead and/or a processor device external to the readhead could be configured to analyse the output from the reference photodetector.

As will be understood, the non-imaged representation is controlled by the features modulating the intensity of light emanating from the light source reaching the reference photodetector. Accordingly, the reference mark causes a change in the intensity of the light from the source reaching the reference photodetector. Accordingly, the reference mark causes a contrast feature to be present in the non-imaged representation of the scale. Accordingly, the encoder apparatus could be configured to identify a change in intensity. The reference mark could cause a reduction in the intensity of light reaching the reference photodetector (e.g. with respect to the rest of the track containing the reference mark). Accordingly, the reference mark can be a dark reference mark. In this case, the output of the at least two detector channels will fall as they pass over the reference mark. Optionally, the reference mark causes an increase in the intensity of light reaching the reference photodetector (e.g. with respect to the rest of the track containing the reference mark). Accordingly, the reference mark can be a bright reference mark. In this case, the output of the at least two detector channels will rise as they pass over the reference mark.

The encoder apparatus can be configured to determine a difference signal of the output of the at least two detector channels. This can aid accurate determination of the reference mark. The readhead can be configured/comprise the capability to use the outputs of the at least two detector channels so as to produce the difference signal. For example, the readhead can comprise electronics to produce the difference signal from the outputs of the at least two detector channels. However, as will be understood, this need not necessarily be the case, and a device external to the readhead can be configured to/comprise the capability to use the outputs of the at least two detector channels so as to produce the difference signal. The difference signal can be used to determine a reference position. The readhead could be configured to determine the reference position. Optionally a device external to the readhead can be configured to determine the reference position.

The encoder apparatus can be configured such that light from the source interacts with the incremental scale marks and the at least one diffraction grating to produce diffraction orders which combine to produce at the incremental photodetector a resultant field which varies with relative movement of the scale and readhead. Light from the source can interact with the incremental scale marks and the at least one diffraction grating to produce an interference fringe at the incremental photodetector which changes with relative movement of the scale and readhead. The light from the source can interact first with the incremental scale marks to produce a first set of diffraction orders which then interact with the at least one diffraction grating to produce further diffraction orders which recombine to produce the interference fringe at the at least one photodetector. Such types of incremental systems are known to provide good dirt immunity.

As specified above, the features defining the reference mark are configured such that the reference mark, as resolvable by each of the at least two detector channels, comprises a single feature. Accordingly, the reference mark need not necessarily be optically uniform. Preferably, the reference mark is substantially optically uniform. Furthermore, reference mark pre-cursors could be provided (e.g. which could signal to the encoder apparatus that it is near/approaching a reference mark), however as will be understood the reference position will be defined by a single reference mark (i.e. that, as resolvable by the at least two detector channels, comprises a single feature).

The reference mark/reference position could be a limit mark/limit position. As will be understood, a limit mark/limit position identifies a boundary, e.g. the desired end, of the scale.

As will be understood, the at least two detector channels are offset at least partially in the measuring dimension. Preferably, the at least two detector channels are offset in the measuring dimension. Preferably, the at least two detector channels are offset in the measuring dimension, but in line with each other in a dimension perpendicular to the measuring dimension.

The scale can be a transmissive scale. Optionally, the scale is a reflective scale. In this case, the at least one light source and the incremental and reference photodetector(s) can be placed on the same side of the scale. Accordingly, the shadow/non-imaged representation can be created by way of the scale's features reflecting different amounts of light from the source back toward the readhead's detector channels along the scale's length.

The reference mark could be at least partially embedded within the incremental scale marks. For instance, the incremental scale marks could be contained within a track, and the reference mark could be at least partially embedded within the same track. Optionally, the incremental scale marks and the reference mark are contained in separate tracks on the scale. The incremental and reference mark tracks can be provided on different substrates. Optionally, the incremental and reference mark tracks can be provided on the same substrate.

Optionally, only the scale's markings in the track containing the reference mark cast a shadow/provide a non-imaged representation on the reference photodetector. Accordingly, in the case in which the reference mark is contained in a track separate to the incremental marks, the encoder apparatus can be configured such that any non-imaged representation of/shadow cast by the scale's features that define the incremental scale marks does not fall on the reference photodetector.

The scale's features can define a plurality of separate reference marks. Each of the separate reference marks can define a different reference position.

As will be understood, the light source could comprise one or more light emission components. The light source can comprise a divergent light source (e.g. can produce a divergent light beam). Optionally, the optical power (in dioptres, $m^{-1}$) of any optical component in the optical path between the light emission component and the reference photodetector (for example in the part of the optical path within readhead) is between −100 and 100, for example between −50 and 50, for instance between −10 and 10, in particular between −5 and 5. Optionally, the optical power (in dioptres m$^{-1}$) of any optical component in the optical path between the light emission component and the reference photodetector (in particular the part of the path within the readhead) is substantially 0. Accordingly, optionally, no lens for imaging the scale (e.g. the track containing the reference mark), and optionally no lens, is provided in the optical path (in particular within the readhead) between the light emission component(s) of the light source and the reference photodetector.

The light source could emit light in the visible range. As will be understood, suitable light sources include those that emit light anywhere in the infra-red to the ultraviolet range of the electromagnetic spectrum. Optionally, the light source emits light in the infra-red range.

The light source could comprise a divergent light source. That is the light emanating from the light source diverges away from the light source. Optionally, the light beam's divergence remains substantially unaltered throughout the optical path between the light emission component and the reference photodetector.

According to another aspect of the invention there is provided an incremental two-grating encoder apparatus comprising: a scale; a readhead comprising: a non-collimated light source for producing a (optionally divergent) light beam; a diffraction grating; and a photodetector array; configured such that the light beam interacts with the scale and then with the diffraction grating to produce an interference fringe at the photodetector array which changes with relative movement of the scale and readhead, and characterised in that the optical power (in dioptres, m$^{-1}$) of all optical components in the optical path between the light source and the photodetector array (for example within the part of the optical path within readhead) is between −100 and 100, for example between −50 and 50, for instance between −10 and 10, in particular between −5 and 5. Accordingly, in the case of a divergent light beam, the light beam's divergence can remain substantially unaltered throughout said path.

As will be understood, features described above in connection with the first aspect of the invention are also applicable to this other aspect of the invention (and the below further aspect of the invention) and vice versa. For instance, optionally, the optical power (in dioptres, m$^{-1}$) of any optical component in the optical path between the light source and the reference photodetector (for example within the part of the optical path within readhead) is substantially 0. Accordingly, optionally no imaging lens, and optionally no lens, is provided in the optical path between the light emission component(s) of the light source and the reference photodetector (for example no lens is provided within the part of the optical path that is within the readhead).

Optionally, the optical power (in dioptres, m$^{-1}$) of any optical components in the readhead is between −100 and 100, for example between −50 and 50, for instance between −10 and 10, in particular between −5 and 5, for example substantially 0.

According to a further aspect of the invention there is provided an encoder apparatus comprising: a scale; and a readhead comprising: a light source; a diffraction grating; and a photodetector array; configured such that light field from the light source interacts with the scale and then with the diffraction grating to produce an interference fringe at the photodetector array which changes with relative movement of the scale, characterised in that the encoder apparatus is without an optical device, for example a lens, that alters the wavefront curvature of the light from the light source.

Embodiments of the invention will now be described, by way of example only, with reference to the following drawings in which.

Figure 1:
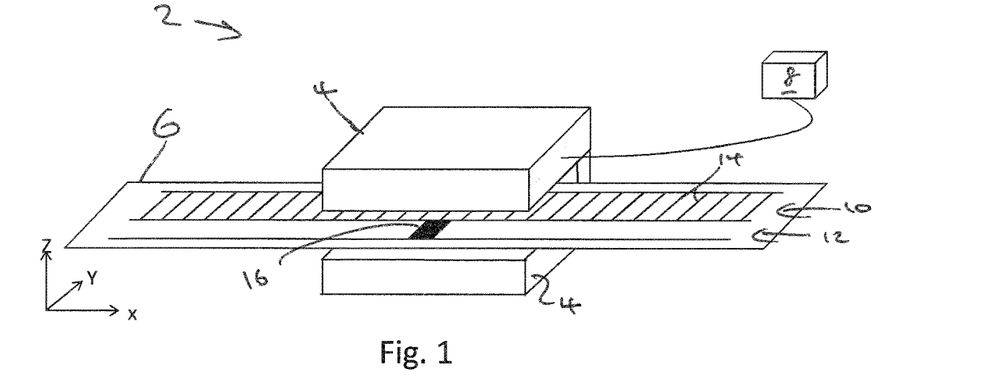
FIG. 1 is a schematic isometric view of a transmissive encoder according to the present invention.

With reference to FIG. 1 there is shown an encoder apparatus 2 according to the present invention. The encoder apparatus comprises a readhead 4 and a scale 6. Although not shown, typically in practice the readhead 4 will fastened to one part of a machine and the scale 6 to another part of the machine which are movable relative to each other. The readhead 4 is used to measure the relative position of itself and the scale 6 and hence can be used to provide a measure of the relative position of the two movable parts of the machine. Typically, the readhead 4 communicates with a processor such as a controller 8 via a wired (as shown) and/or wireless communication channel. The readhead 4 can report the signals from its detectors (described in more detail below) to the controller 8 which then processes them to determine position information and/or the readhead 4 can itself process the signals from its detectors and send position information to the controller 8.

The scale 6 comprises a plurality of scale markings defining an incremental track 10, and a reference track 12.

The incremental track 10 comprises a series of periodic scale marks 14 which control the light transmitted toward the readhead to effectively form a diffraction grating. The incremental track 10 could be what is commonly referred to as an amplitude scale or a phase scale. As will be understood, if it is an amplitude scale then the features are configured to control the amplitude of light transmitted toward the readhead's incremental detector (e.g. by selectively absorbing, scattering and/or reflecting the light). As will be understood, if it is a phase scale then the features are configured to control the phase of light transmitted toward the readhead's incremental detector (e.g. by retarding the phase of the light). In the present embodiment, the incremental track 10 is an amplitude scale, but in either case, as explained in more detail below, the light interacts with the periodic scale marks 14 to generate diffracted orders.

The reference track 12 comprises a reference position defined by a reference mark 16. As previously explained, reference positions can be useful to enable the readhead 4 to be able to determine exactly where it is relative to the scale 6. Accordingly, the incremental position can be counted from the reference position. Furthermore, such reference positions can be what are also referred to as "limit positions" in that they can be used to define the limits or ends of the scale 6 between which the readhead 4 is permitted to travel.

Figure 2:
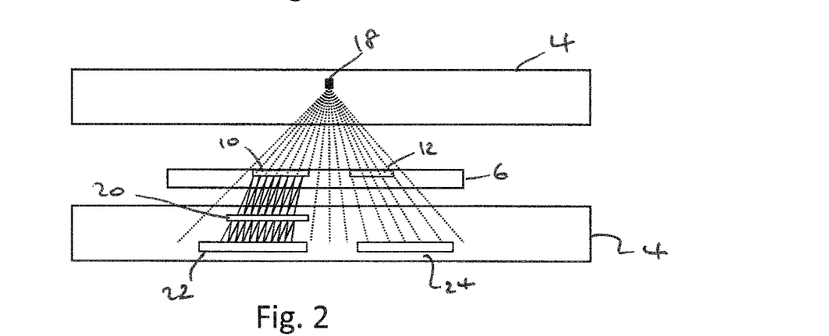
FIG. 2 is a schematic cross-sectional view of the encoder of FIG. 1, looking along the length of the scale, illustrating the reflection of the light from both the incremental and reference mark tracks on the scale.

FIG. 2 schematically illustrates the optical components of the readhead 4. In this embodiment, the encoder apparatus is a transmissive encoder in that it comprises an electromagnetic radiation (EMR) source 18, e.g. a infra-red light source 18, positioned to be on a first side of the scale 6 when in use, and at least one detector on the opposite side of the scale 6. In general, infra-red light from the light source 18 is configured to be transmitted through the scale 6 toward the detector. As illustrated, the light source is divergent and the light source's illumination footprint falls on both the incremental track 10 and the reference track 12. In the embodiment described, the light source emits EMR in the infra-red range, however as will be understood, this need not necessarily be the case and could emit EMR in other ranges, for example anywhere in the infra-red to the ultra-violet. As will be understood, the choice of a suitable wavelength for the source can depend on many factors, including the availability of suitable gratings and detectors that work at the EMR wavelength. As also illustrated, on the receiving side of the readhead 4, there is provided a diffraction grating 20 (also commonly referred to as an index grating), an incremental photodetector 22 and a reference photodetector 24.

These components will be explained in more detail below, but in summary, the infra-red light from the from the source 18 is emitted from the readhead 4 toward the scale 6, where part of the light source's footprint interacts with the reference track 12 and part of the light source's footprint interacts with the incremental track 10. In the currently described embodiment, the reference position is defined by a feature 16 in the reference mark track 12 which reduces the intensity of light from the source which can reach the reference photodetector 24. This could be achieved for example, by the feature absorbing, reflecting and/or scattering more infra-red light than the rest of the reference track 12. In any case, a non-imaged representation of the scale's mark(s) defining the reference position (in this case the single-feature reference mark 16 itself) falls on the reference detector 24 as the readhead passes over the reference position (see FIG. 4 for more details). In other words, a shadow of the scale's mark(s) defining the reference position (in this case the single-feature reference mark 16 itself) is cast on the reference detector 24 as the readhead passes over the reference position (see FIG. 4 for more details). In particular, in this embodiment, the feature 16 substantially prevents the infra-red light from the source 18 reaching the reference photodetector 24 (e.g. completely blocks the light from the source 18). In the position illustrated in FIG. 2, the readhead 4 is not aligned with the reference position and so the infra-red light is shown as being transmitted through the reference track 12 onto the reference photodetector 24.

With respect to the incremental track 10, infra-red light from the source 18 falls on the periodic scale marks 14, which define a diffraction pattern. The infra-red light therefore diffracts into multiple orders, which then fall onto the diffraction grating 20 in the readhead. In the present embodiment, the diffraction grating 20 is a phase grating. The light is then further diffracted by the diffraction grating 20 into orders which then interfere at the incremental photodetector 22 to form a resultant field, in this case an interference fringe.

Figure 8:
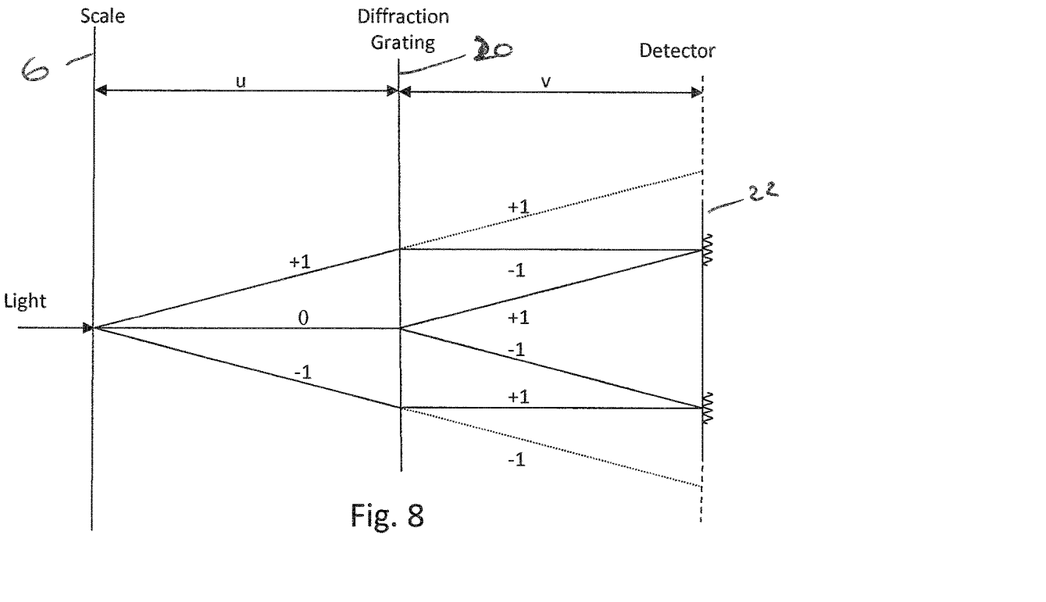
FIGS. 8 and 9 are schematic ray diagrams schematically illustrating the generation of a resultant field at the incremental photodetector via the use of diffracted light so as to facilitate incremental reading of the readhead position.
Figure 9:
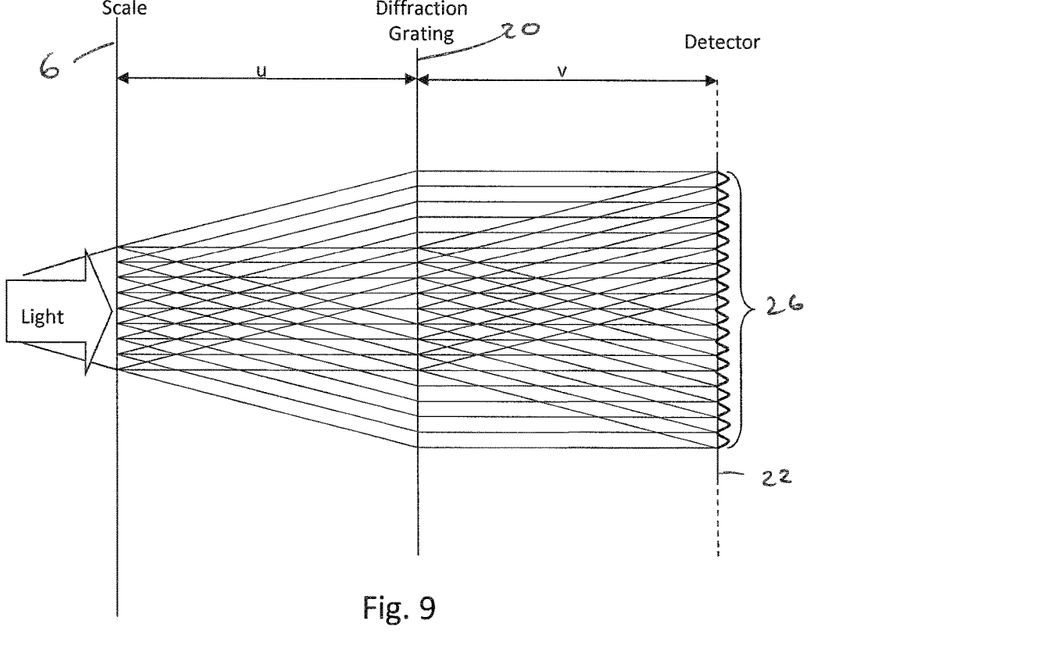
Figure 10:
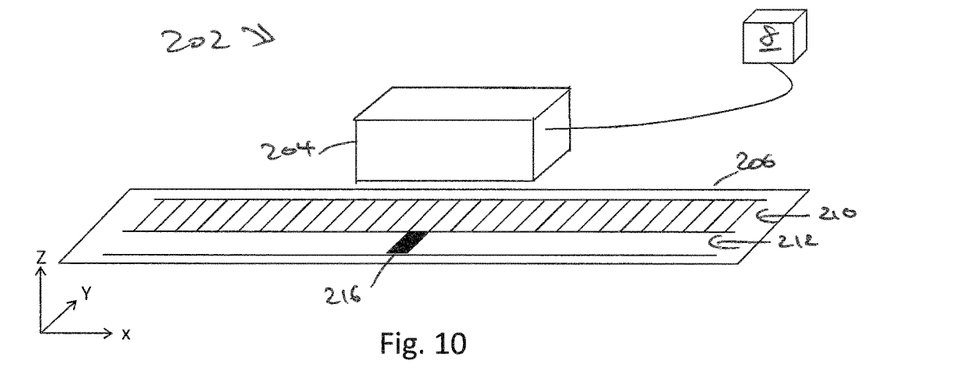
FIG. 10 is a schematic illustration of a first reflective embodiment of an encoder apparatus according to the present invention.
Figure 11:
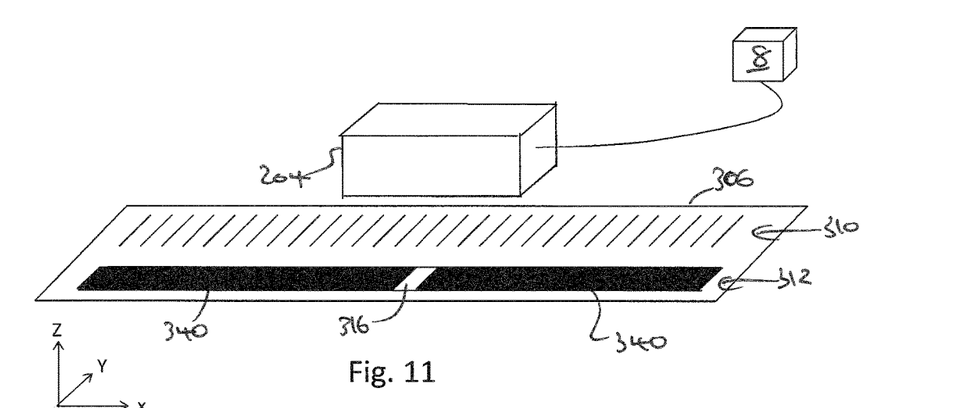
FIG. 11 is a schematic illustration of a second reflective embodiment of an encoder apparatus according to the present invention.

The generation of the interference fringe is explained in more detail with reference to FIGS. 8 and 9. As will be understood, FIG. 8 is a very simplified illustration of the real optical situation encountered in an encoder apparatus. In particular, the situation is shown for only one light ray from the source whereas in fact an area of the incremental track 10 is illuminated by the source. Accordingly, in reality the optical situation shown in FIG. 8 is repeated many times over along the length of the scale (i.e. over the area that is illuminated by the source), hence producing a long interference pattern at the detector, which is schematically illustrated in FIG. 9. Also, for illustrative purposes only the $+/-1^{st}$ orders are shown (e.g. as will be understood the light will be diffracted into multiple orders, e.g. $+/-3^{rd}$, $+/-5^{th}$, etc diffraction orders). The light is diffracted by the series of periodic features 14 in the incremental track 10 of the scale 6, and the diffraction orders propagate toward the diffraction grating 20 where the light is diffracted again before forming a resultant field 26 (in this case an interference fringe, but could for example be modulated spot(s)) at the incremental detector 22. As shown in FIG. 9, the resultant field 26 is produced by the recombination of diffracted orders of light from the diffraction grating 20 and scale 6.

The incremental detector 22 detects the resultant field 26 (e.g. the interference fringes) to produce a signal which is output by the readhead 4 to an external device such as controller 8. In particular, relative movement of the readhead 4 and scale 6 causes a change in the resultant field (e.g. movement of the interference fringes relative to the detector 22 or a change in intensity of the modulated spot(s)) at the incremental detector 22), the output of which can be processed to provide an incremental up/down count which enables an incremental measurement of displacement.

Figure 19:
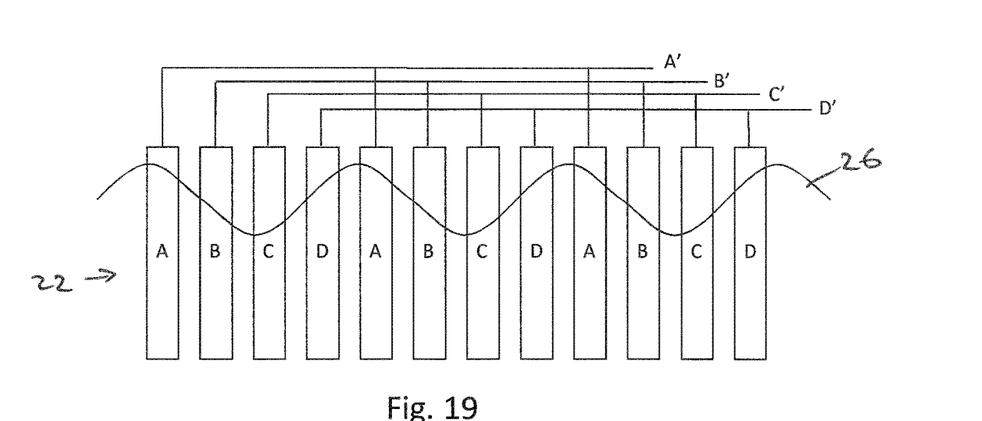
FIG. 19 is a schematic drawing of one type of incremental detector suitable for use in a readhead according to the invention.

The incremental detector 22 can comprise a plurality of photodiodes, for example. In particular, as will be understood, in embodiments in which an interference fringe 26 is produced at the incremental detector 22, the incremental detector 22 can be in the form of an electrograting, which in other words is a photo-sensor array which can for example comprise two or more sets of interdigitated/interlaced photosensitive sensors, each set detecting a different phase of the interference fringe 26 at the detector 22. An example is illustrated in FIG. 19, in which a part of an incremental detector 22 is shown, and in which the photodiodes of four sets of photodiodes A, B, C and D are interdigitated, and the outputs from each photodiode in a set are combined to provide a single output, A', B', C' and D'. These outputs are then used to provide quadrature signals. For example, A'-C' could be used to provide a first signal and B'-D' could be used to provide a second signal which is 90 degrees out of phase from the first signal (e.g. Cos and Sin signals). As illustrated, at any one instant in time, all the photodiodes in any one set detect the intensity of same phase of the interference fringe (if the fringe period and sensor period are the same). This arrangement has the advantage that due to a filtering effect of the optics, the readhead 4 is largely immune to a disruption to the periodicity of the periodic scale marks 14. Thus, the presence of contamination and/or an embedded reference mark does not significantly affect the interference fringe detected by the incremental detector 22. More details of a scale and readhead of this type are described in U.S. Pat. No. 5,861,953, the entire contents of which are incorporated into this specification by this reference. As will be understood, the electrograting/photo-sensor array can take other forms, such as comprising only three sets of photodiodes that are interdigitated, and different layouts can be used.

Figure 3:
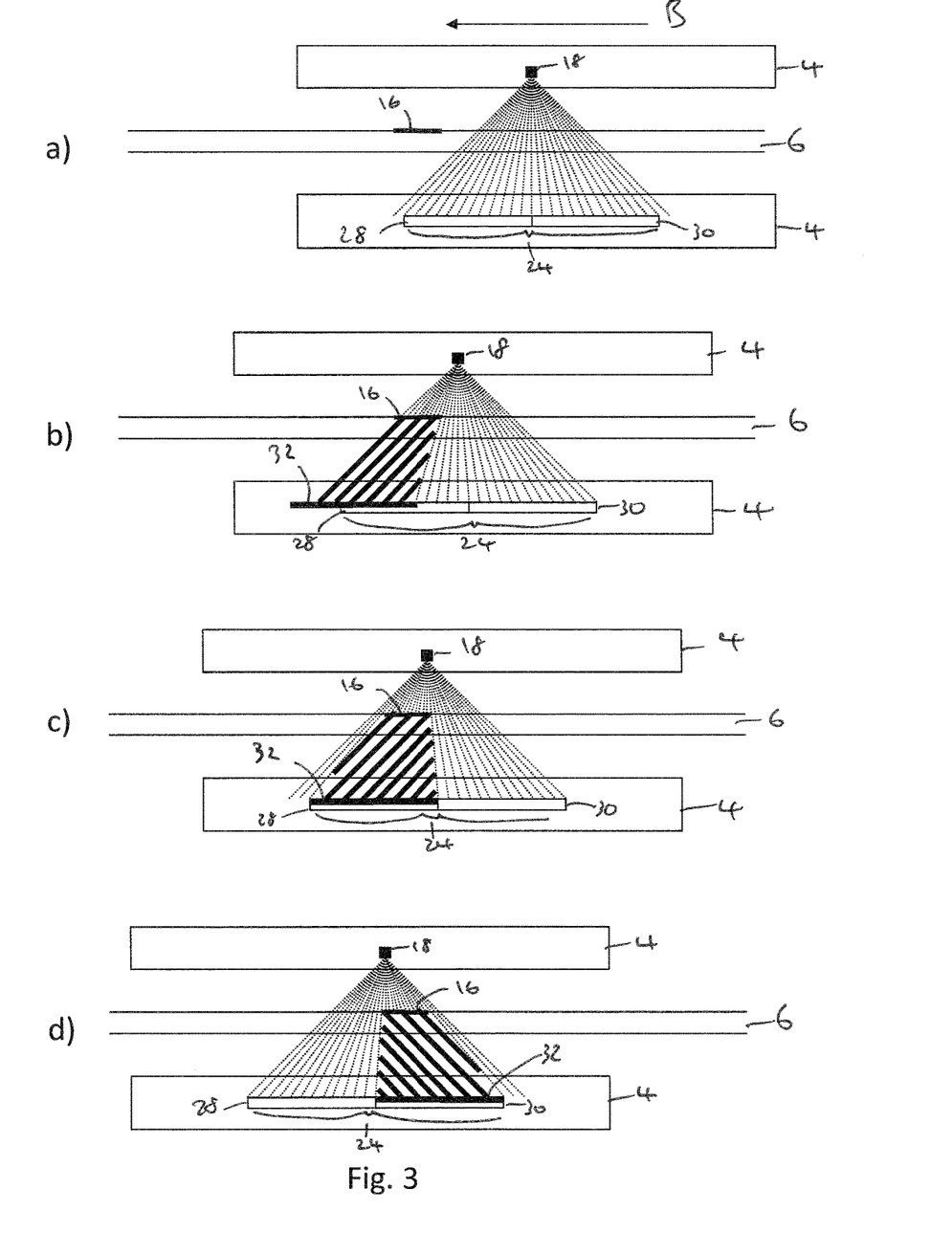
FIGS. 3(a) to (d) are schematic cross-sectional views of the encoder of FIG. 1 illustrating the readhead passing a reference position on the scale.
Figure 4:
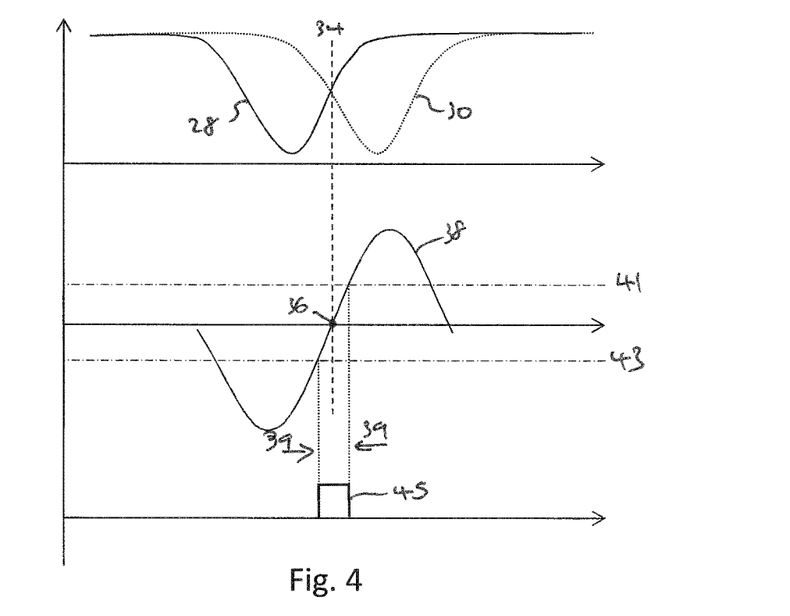
FIG. 4 is a graph illustrating the outputs of the reference position photodetectors of the readhead of FIGS. 1 to 3 as they pass over the reference position, and their difference signal.

FIGS. 3 and 4 illustrate how the reference position is detected. As illustrated by the succession of FIGS. 4(a) to 4(d), as the readhead passes the reference position, the light from the light source 18 is blocked by the feature 16 in the reference track 12, preventing it from reaching the reference photodetector 24, and thereby forming a non-imaged representation in the form of a shadow 32 on the reference photodetector 24. As illustrated, in the embodiment described the reference photodetector 24 is actually a "split detector" which comprises first 28 and second 30 separate detector channels offset relative to each other in the measuring direction. Each of these two separate detecting channels measure the intensity of light falling on it, and provides an output proportional to the intensity measured. The reference mark 16 and the first 28 and second 30 separate detector channels are configured such that the reference mark 16, as resolvable by the first 28 and second 30 separate detector channels comprises a single feature. In other words, the reference mark 16 and the first 28 and second 30 separate detector channels are configured such that the reference mark 16, as seen by the first 28 and second 30 separate detector channels comprises a single resolvable feature. According as far as the first 28 and second 30 separate detector channels are concerned, the reference mark 16 is a "single-feature" reference mark. This ensures that (ignoring noise) a single-bump/peak or single-dip signal is output by each of the first 28 and second 30 separate detector channels. This leads to a much cleaner difference signal (explained in more detail below) and thereby aids accurate and reliable determination of the reference position.

Figure 21:
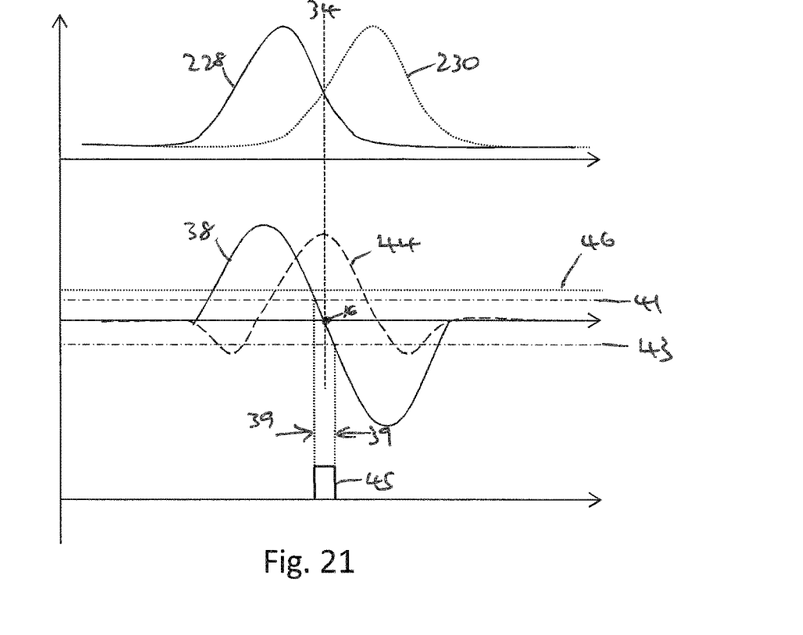
FIG. 21 is a graph illustrating the outputs of the reference photodetectors of FIG. 20 as incorporated into a readhead of FIG. 16 as they pass over the reference position, and their difference and sum signals.
Figure 22:
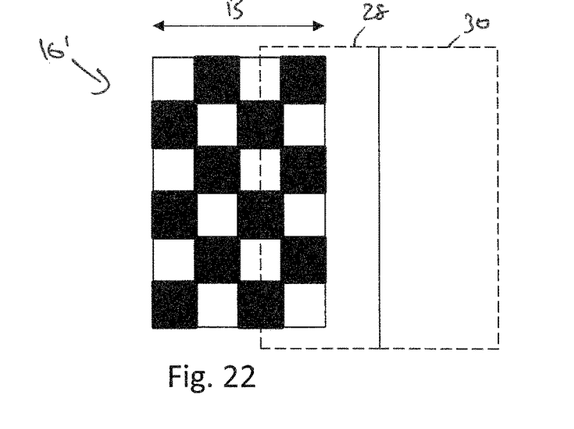
FIG. 22 illustrates a different type of reference mark suitable for use with the present invention.

As will be understood, in the embodiments described, the reference mark is a single-block feature, in that it is substantially reflects/blocks/absorbs etc light uniformly. However, this need not be the case. For instance, the reference mark could comprise features which are not resolvable by the first 28 and second 30 separate detector channels. For example, the reference marks 16' and 16" illustrated in FIG. 22 (on page 8/10 of the drawings) illustrate patterned reference marks suitable for use with the present invention. The reference mark 16' of FIG. 22 comprises a chequered pattern. However, the first 28 and second 30 separate detector channels cannot resolve, "see", or detect these features separately, and as such a reference mark 16' passes the first 28 and second 30 separate detector channels, the output of the first 28 and second 30 separate detector channels will be in the form of a single-bump/peak or single-dip signal as illustrated in FIGS. 4, 7 and 21.

Accordingly, as the readhead 4 moves relative to the scale 6 in the measuring direction B, a shadow 32 of the scale's markings (in this case the feature 16) which defines the "single-feature" reference mark is cast first on the first detector channel 28 and then the second detector channel 30. The outputs of the first 28 and second 30 detecting channels therefore dip as the readhead 4 passes the reference position, which is illustrated by the top portion of the graph in FIG. 4. As the first 28 and second 30 detecting channels are offset in the measuring direction, the dip in intensity reported by one of the detecting channels lags behind the other. In this embodiment, the reference mark 16 and the first 28 and second 30 detector channels are configured such that the reference position can be determined by determining when a difference signal 38 of the outputs of the first 28 and second 30 detector channels (e.g. obtained via a differential amplifier) crosses between upper 41 and lower 43 threshold levels. As illustrated, this "zone" defined by the two threshold levels 41, 43 contains the point at which the two signals 28, 30 cross (at the point illustrated by line 34) and hence also contains the point at which the difference signal 38 crosses a zero value (e.g. at point 36). Accordingly, the reference position is actually determined as a reference "zone" 39 between two threshold levels 41, 43. When the difference signal is within this zone 39, a reference pulse, schematically illustrated by pulse 45 is output by the readhead 4 to the controller/processor device 8. The width of the reference pulse is not greater than one lissajous cycle of a lissajous which can be determined from the incremental quadrature signals. More details on detecting a reference position by obtaining the difference between outputs of two detecting channels is described in U.S. Pat. Nos. 7,624,513 and 7,289,042.

Figure 5:
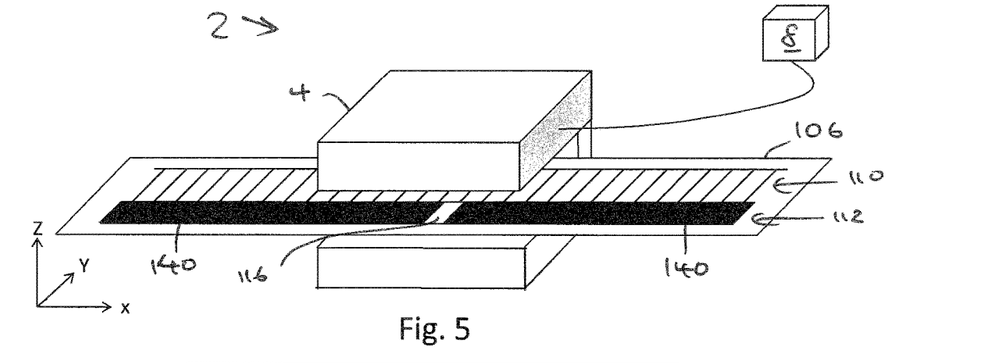
FIG. 5 illustrates an alternative embodiment of a transmissive encoder according to the present invention.
Figure 6:
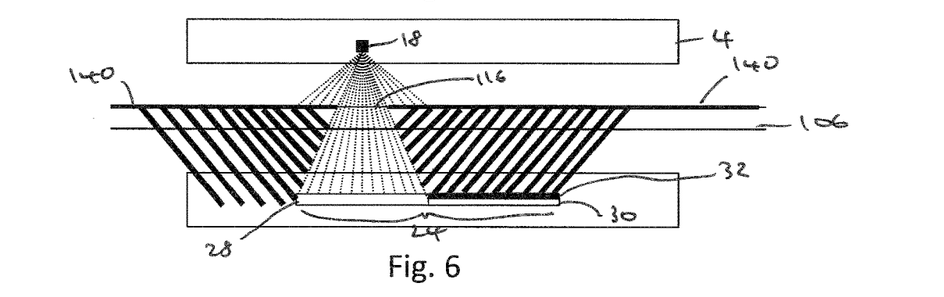
FIG. 6 illustrates a cross-sectional view of the encoder of FIG. 5, looking across the scale, when it is position over a reference position on the scale.
Figure 7:
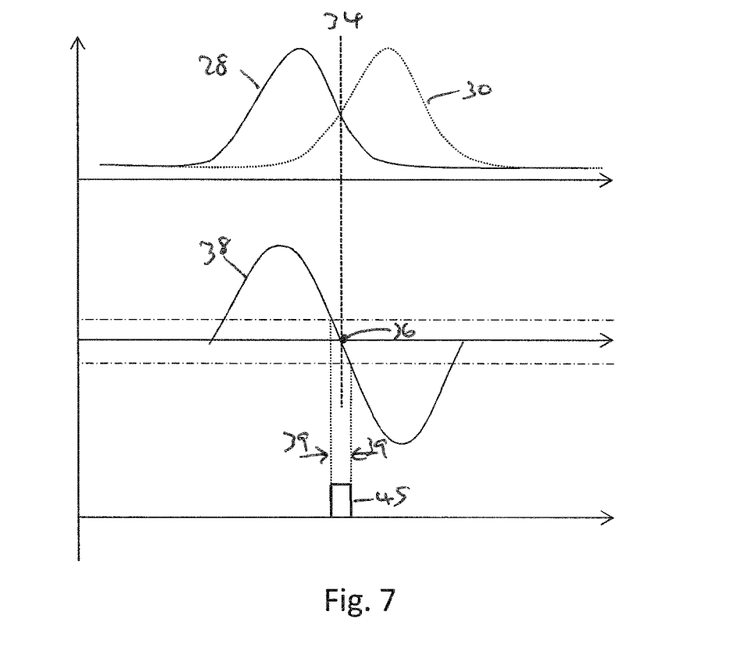
FIG. 7 is a graph illustrating the outputs of the reference position photodetectors of the readhead of FIGS. 5 and 6 as they pass over the reference position, and their difference signal.

FIGS. 5 to 7 illustrate a second embodiment of the invention. The second embodiment is similar to the first embodiment in that it is also a transmissive encoder apparatus, and like parts share like reference numerals. A difference to the first embodiment is that the reference track 112 of the scale 106 defines the reference position by having a "single-feature" reference mark 116 (as can be resolved by the elements of the reference mark detector) which permits a relatively greater amount of light from the source 18 to reach the first 28 and second 30 detector channels of the reference detector 24 compared to the rest of the reference track. Accordingly, the scale 6 (and in particular the reference track 112) comprises markings in the form of light restrictor markings 140 which extend along the length of the reference track 112. As with the embodiment of FIG. 1, these light restrictor markings 140 need not necessarily completely stop the light from reaching the reference detector 24. Rather they could, for example, merely reduce the amount of light reaching the reference detector 24 compared to the single-feature reference mark 116.

In this embodiment the scale marking's (i.e. the light restrictor markings 140) that define the single-feature reference mark 116 cast a shadow onto the reference detector 24 for most of the length of the scale 106. (In other words, the reference detector 24 is in the light restrictor marking's 140 shadow for most of the length of the scale). However, as the readhead 4 passes the reference position, the single-feature reference mark 116 lets the light from the source 18 through the scale 6 and onto the first 28 and second 30 detector channels of the reference detector 24. The reference position is determined in a similar manner as before, but as will be understood, and as illustrated by the graph of FIG. 7, the signals are inverted.

The invention can also be utilised in reflective encoder apparatus 202, as illustrated and explained below in connection with FIGS. 10 to 18. In these cases, the scale 206, 306, 406 is configured to reflect light from the readhead's 204 light source 218 back toward the readhead 204. For example, with reference to FIGS. 13 and 14, the readhead 204 comprises a light source 218, an incremental detector 222, and a reference detector 224 (comprising first 228 and second 230 detector channels offset in the measuring direction). These readhead components are substantially the same as that described in connection with the embodiments of FIGS. 1 to 9, and operate in the same way, the only difference being that they are all positioned on the same side of the scale 206. Accordingly, an interference fringe (not shown) is created and detected at the incremental detector 222 in the same manner as described in connection with FIGS. 8, 9 and 16, the only difference being that the ray diagrams of FIGS. 8 and 9 would (for the embodiments of FIGS. 10 to 18) be reflected about the scale. Likewise, the reference position is determined in the same way, that is, by finding the zero-crossing point of a difference signal obtained by differentially amplifying the output of the first 228 and second 230 detector channels of the reference detector 224.

Figure 13:
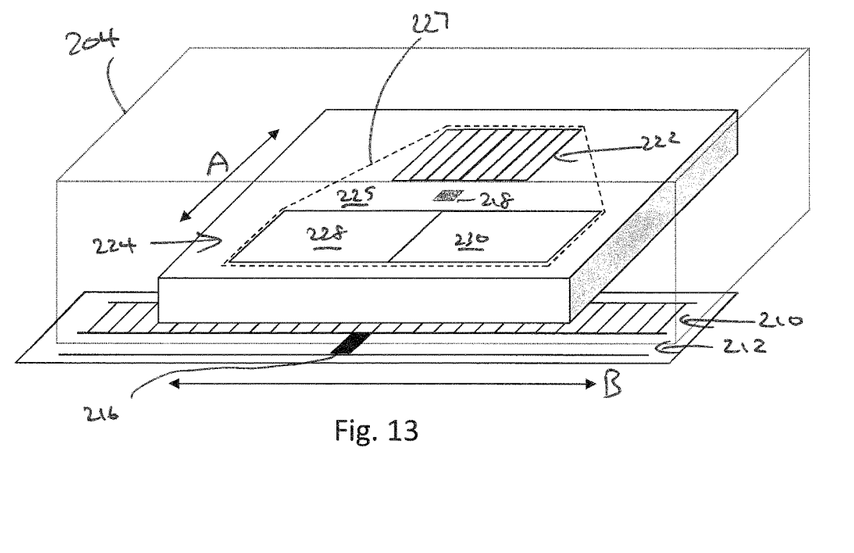
FIG. 13 is a schematic illustration of the light source, incremental detector and reference position detector within the readhead of FIG. 10.
Figure 14:
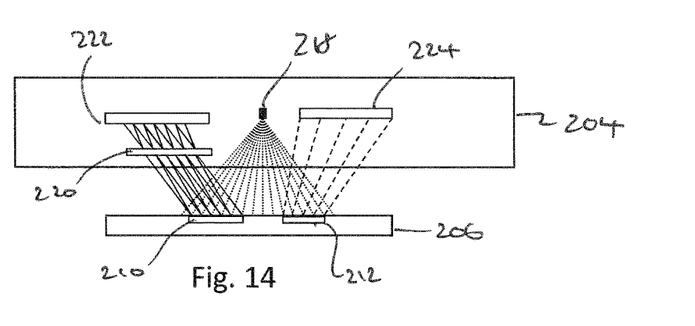
FIG. 14 is a schematic cross-sectional view of the encoder of FIGS. 10 and 13, looking along the length of the scale, illustrating the reflection of the light from both the incremental and reference mark tracks on the scale.

As shown in the embodiment of FIG. 13, the reference position is defined by a reference mark 216 which is configured to reflect less light back toward the reference detector 224 than the rest of the reference track 212. The single-feature reference mark 216 could achieve this by, for example, absorbing, or scattering the light, (or even for example by permitting it to travel through the scale substrate so that it is not reflected back toward the reference detector 224).

Figure 15:
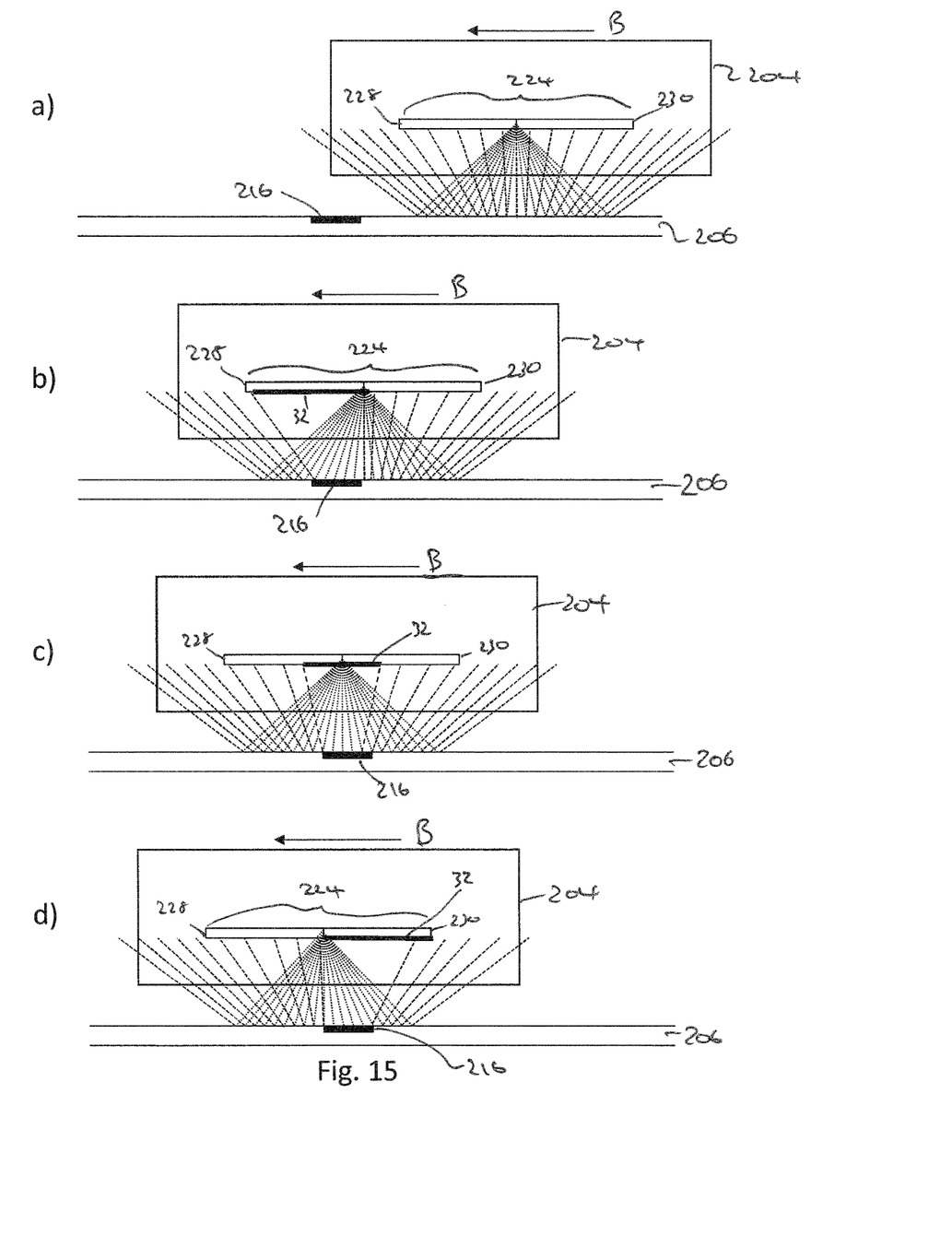
FIGS. 15(a) to (d) is are schematic cross-sectional views of the encoder of FIGS. 10, 13 and 14, looking across the scale, illustrating the readhead passing a reference position on the scale.

Accordingly, as illustrated by the succession of FIGS. 15(*a*) to (*d*), for the majority of the scale's 206 length, light from the source is reflected back in the direction the readhead 204. However, as the readhead 204 passes the reference position, a shadow is created by the scale's marking's that define the reference mark (e.g. in this embodiment the reference mark itself) and is cast onto the reference detector 224, such that a non-imaged representation of the reference mark track 212 falls on the reference detector 224. This shadow/non-imaged representation is created by way of the single-feature reference mark 216 not reflecting as much light (for example reflecting substantially no light) back toward the readhead 204. This shadow/non-imaged representation of the scale's marking sweeps across the first 228 and second 230 detector channels and the reference position is detected by analysing the difference signal obtained by differentially amplifying the outputs of the first 228 and second 230 detector channels to determine when it crosses between the first 41 and second 43 thresholds as described above.

In the embodiments described, the light source 18, 218 is an infra-red Light Emitting Diode ("LED").

As shown, the light source 218 is positioned between the incremental photodetector 222 and the reference photodetector 224, in a direction (illustrated by arrow A) transverse to the reading direction (illustrated by arrow B) of the readhead. This facilitates good even illumination of both the incremental track 210 and reference mark track 212. In particular, in this embodiment, the light source 218 is positioned substantially equidistantly between the incremental photodetector 222 and the reference photodetector 224, and is contained within an area 225 defined by the outer extents of the readhead's 204 incremental 222 and reference mark 224 photodetectors (schematically illustrated by the dashed line 227).

Figure 16:
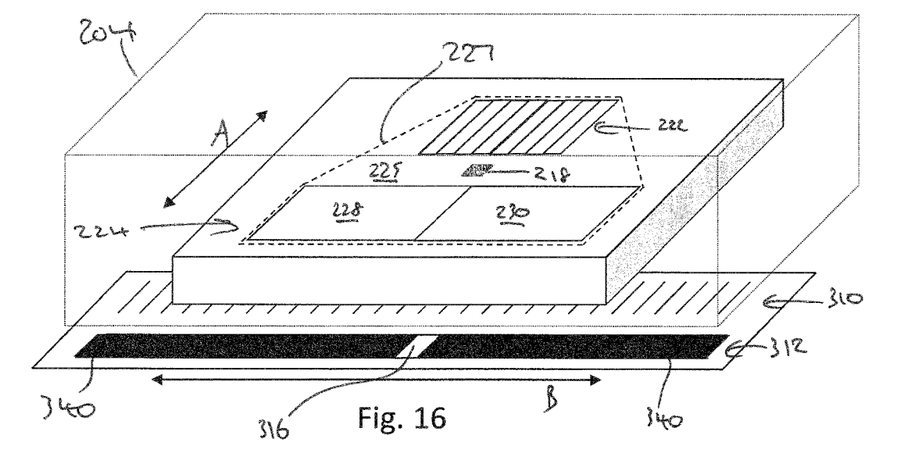
FIG. 16 is a schematic illustration of the light source, incremental detector and reference position detector within the readhead of FIG. 11.
Figure 17:
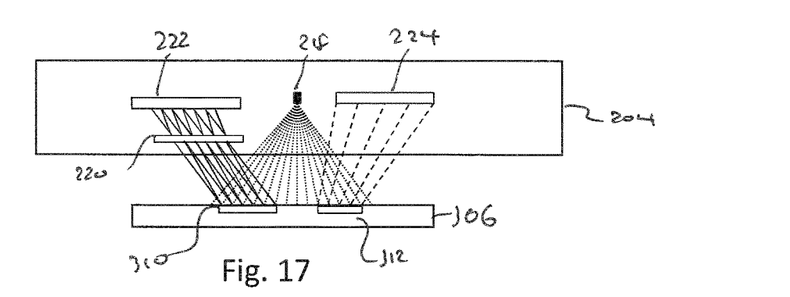
FIG. 17 is a schematic cross-sectional view of the encoder of FIGS. 11 and 16, looking along the length of the scale, illustrating the reflection of the light from both the incremental and reference mark tracks on the scale.
Figure 18:
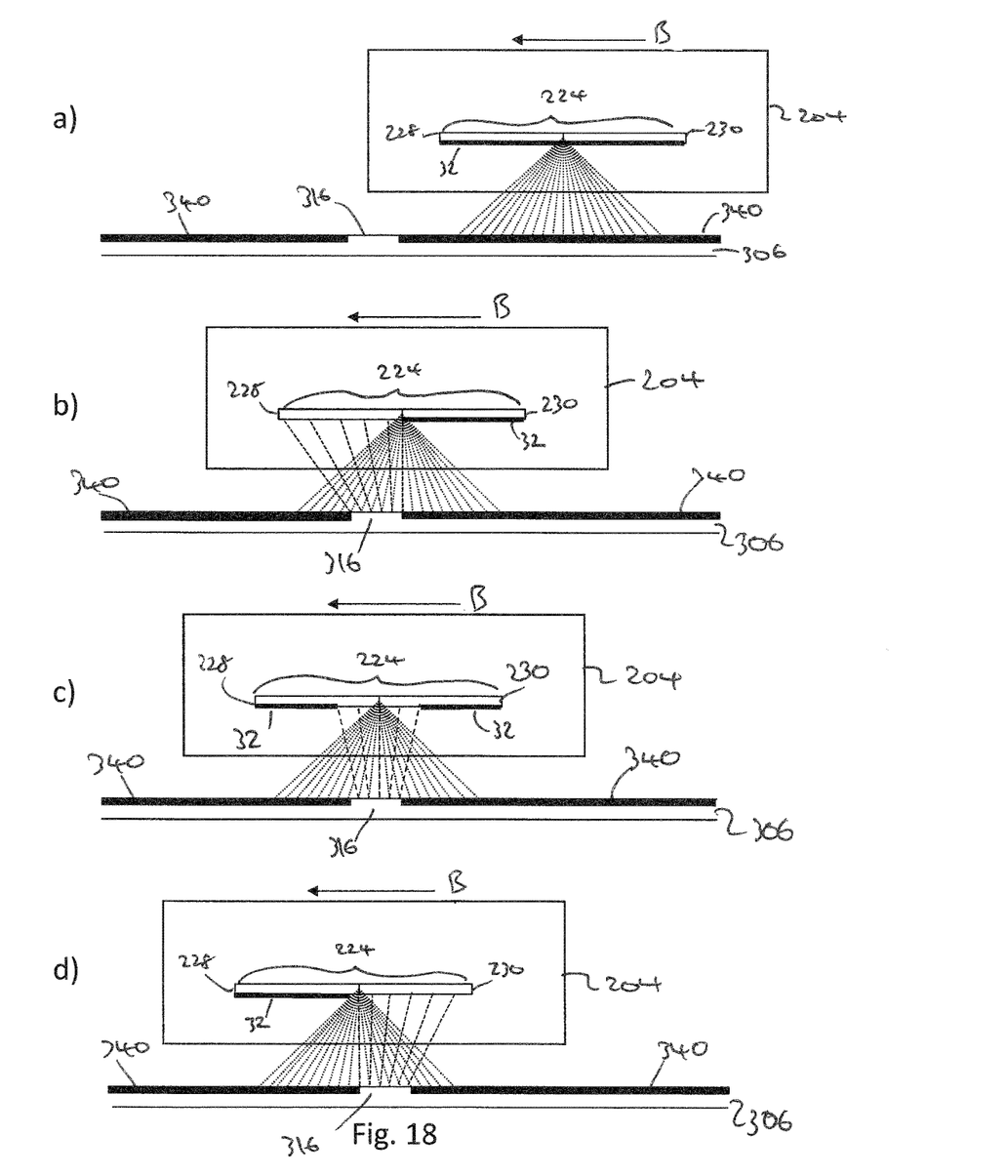
FIGS. 18(a) to (d) is are schematic cross-sectional views of the encoder of FIGS. 10, 16 and 17, looking across the scale, illustrating the readhead passing a reference position on the scale.

An alternative embodiment is shown in FIGS. 16 to 18. As with the embodiment of FIGS. 13 to 15, this embodiment is a reflective encoder apparatus and operates in the same manner. However, in this case, the reference mark 316 is defined by scale markings in the form of light restrictive features 340 which absorb (or could scatter or allow transmission of) light from the light source 218. Accordingly, the reference detector 224 (and in particular the first 228 and second 230 detector channels) sit in the shadow of the scale's markings that define the single-feature reference mark (that is, sit in the shadow of the light restrictive features 340) for the majority of the scale's length, apart from when it passes the reference position, again causing a non-imaged representation of the reference mark track 312 to fall on the reference photodetector 224. Again, a difference signal obtained by differentially amplifying the outputs of the first 228 and second 230 detector channels can be used to identify the reference position.

Figure 12:
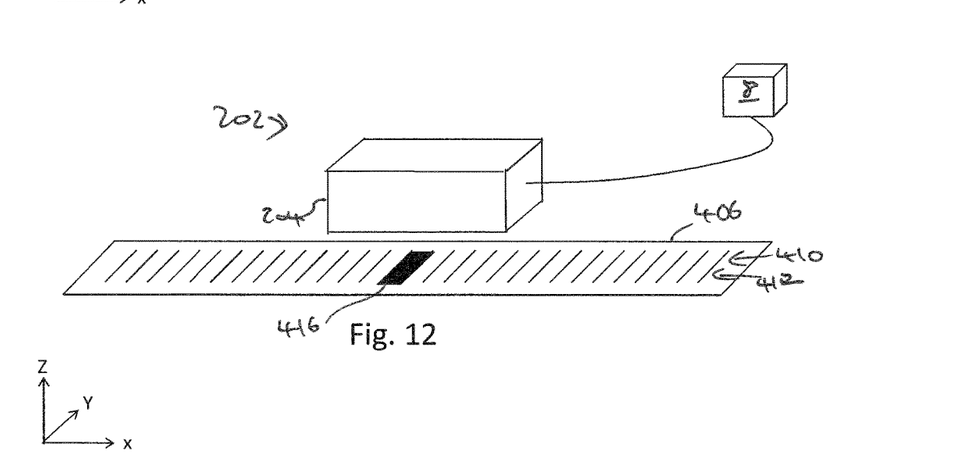
FIG. 12 is a schematic illustration of a third reflective embodiment of an encoder apparatus according to the present invention.

In the above embodiments, the reference position is defined by scale markings that are contained in a separate track to those scale markings defining the incremental scale. However, this need not necessarily be the case. For example, FIG. 12 shows an "embedded" single-feature reference mark 416, which is contained in the same track as the incremental scale marks. The reference position can be determined in the same way as the other described embodiments.

In the embodiments described in connection with the reflective encoders in FIGS. 13 to 18, the light source 218 is shown to be located at a plane containing the incremental 224 and reference 224 photodetectors. However, as will be understood, this need not necessarily be the case. For instance, the light source 218 could be positioned above or below a plane containing the incremental 224 and/or reference 224 photodetectors (the incremental 224 and reference 224 photodetectors need not necessarily be in the same plane).

Accordingly, the above embodiments all describe encoder systems in which a shadow-cast arrangement of the reference mark track is used to provide a non-imaged representation of at least the reference mark track on the reference photodetector.

As will be noted, in the embodiments described above, no lenses or other optical components which alter the wavefront curvature of light from the light source 18 are provided in the readhead. As will be understood, small, very weak lenses or optical components could be used, but preferably the optical power (in dioptres, $m^{-1}$) of such optical components is no greater than between −100 to 100, for example no greater than between −50 to 50, for instance no greater than between −10 to 10 and in particular no greater than between −5 to 5. The omission of such optical components (or the use of only very weak optical components) enables a very compact readhead to be provided. In particular, our inventors have been able to provide a readhead for use in a reflective encoder, the readhead having a total height of no more than 10 mm, and for example no more than 6.7 mm, with a total system height (top of readhead to top surface of scale) of less than 14 mm, and for example no more than 7.8 mm. Particularly, it has enabled the inventors to reduce the height between the incremental photodetector 22 and the diffraction/index grating 20 to no more than 2.3 mm.

Figure 20:
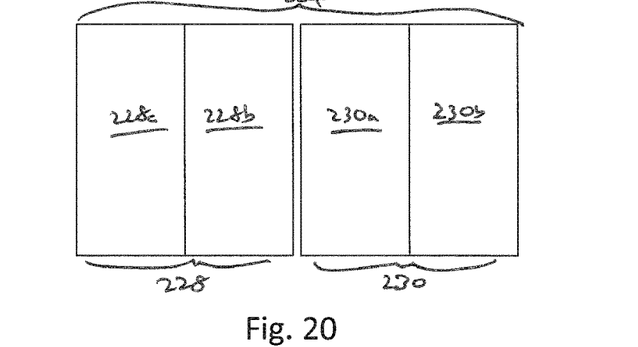
FIG. 20 is a schematic drawing of a reference photodetector according to another embodiment.

In the above embodiments, a reference position is defined by a single-feature reference mark (as resolvable by the reference photodetector(s)) and a difference signal obtained by differentially amplifying the output of first and second detector channels is used to identify the reference position. As will be understood, various other techniques may be used to identify the reference position. For instance, in order to aid the detection of the crossing of the difference signal through the zone defined by the first 41 and second 43 thresholds, a gating signal might be used which identifies when the readhead is in the region of the reference position. The encoder apparatus could be configured to only determine if the difference signal 38 is within the zone defined by the first 41 and second 43 thresholds on activation of the gating signal. The gating signal could be obtained by using additional detector channels, and obtaining a sum signal as explained in more detail in U.S. Pat. No. 7,624,513. For example, FIG. 20 illustrates an alternative embodiment of a reference photodetector 224 which comprises first 228a, second 228b, third 230a and fourth 230b detector channels. In this case, a gating signal can be obtained by obtaining a "sum" and a "difference" signal as follows:

"sum"=("228b"+"230a")−("228a"+"230b")

"difference"=("228a"+"228b")−("230a"+"230b")

As can be seen, obtaining the difference signal essentially combines the outputs of first 228a and second 228b channels as one channel (equivalent to the first 228 channel of the embodiments of FIG. 16) and the combines the outputs of third 230a and fourth 230b channels as one channel (equivalent to the second 230 channel of the embodiments of FIG. 16). Accordingly, the difference signal would be similar to the difference signal 38 shown in FIG. 7. The sum signal 44 is illustrated in FIG. 21 and can be used to ensure that only a zero crossing obtained whilst the sum signal 44 is greater than a predetermined threshold level (illustrated by line 46) causes a reference position to be determined. This helps to avoid false triggers when the difference signals crosses through the zone defined by the first 41 and second 43 thresholds, due to e.g. noise and/or errors in the signal obtained from the reference detector 224.

Optionally, additional features might be provided on the scale to signal to the readhead that it is in the region of a reference position and the readhead could be configured to only to look for a signal indicative of a reference position when it has received such a priming signal. Such features could be contained in another track on the scale, could be provided by a non-optical feature (e.g. a magnetic features detectable by hall sensors in the readhead), or could be optical feature contained in the same track as the single-feature reference mark. However, it will be understood that in the latter case, there is still only one singularly resolvable feature that is used to actually define the reference position and which the readhead looks for to determine the reference position. Furthermore, the reference position need not necessarily be determined by obtaining and analysing a difference signal. For instance, the readhead might comprise only a single detector channel the output of which is analysed, such that when it crosses a predetermined threshold, the reference position is considered to have been identified.

In the above described embodiments a divergent light source is used to illuminate both the incremental and reference mark tracks of the scale. In particular, no lens is used in the optical path of the incremental or reference mark systems of the encoder apparatus. In particular, no lens is used between the light emission component of the light source and the incremental or reference photodetectors. This can be advantageous because it can significantly reduce the size, and in particular the height, of the readhead. The absence of a lens can be advantageous even in encoder apparatus in which no reference mark system (e.g. no reference mark on the scale and/or reference mark photodetector(s)) is provided. Normally, in incremental encoders in which light from the source is initially diffracted by the scale and then the diffraction grating in the readhead so as to form an interference fringe at the incremental photodetector, the light source comprises a lens, such as a collimating lens, so as to significantly reduce the divergence of the light projected toward the scale. Indeed, this is the situation in the SiGNUM and TONiC encoders sold by Renishaw plc, and for instance is the situation described in WO2005/124282. However, our inventors have found that it can be advantageous to not use a lens in such a system (or only use a lens of insignificant power), for instance so as to make the readhead more compact. This is the case, whether or not the encoder apparatus utilises a reference mark.

The invention claimed is:
1. An encoder apparatus comprising:
   an amplitude scale comprising scale features in at least one track which define a series of incremental scale marks and at least one reference mark;
   a readhead comprising a light source, a diffraction grating, an incremental photo detector and a reference photodetector comprising at least two detector channels, the features defining the at least one reference mark being configured such that each of the at least two detector channels resolve the at least one reference mark as a single feature, wherein:
   the encoder apparatus is configured such that light from the source interacts with the incremental scale marks and the diffraction grating to produce diffraction orders which combine to produce at the incremental photodetector a resultant field which varies with relative movement of the scale and readhead, and
   the optical arrangement of the encoder is configured such that a non-imaged representation of at least the track in which the at least one reference mark is contained falls onto the reference photodetector.
2. An encoder apparatus as claimed in claim 1, in which the encoder apparatus is configured such that the scale's features at least in the track in which the at least one reference mark is contained modulates the intensity of light emanating from the source reaching the reference detector such that a shadow-cast arrangement of at least the track in which the reference mark is contained is provided for detecting the reference mark.

3. An encoder apparatus as claimed in claim 1, the encoder apparatus being configured to determine a difference signal of the output of the at least two detector channels.

4. An encoder apparatus as claimed in claim 1, in which the scale is a reflective scale.

5. An encoder apparatus as claimed in claim 1, in which the incremental scale marks and the at least one reference mark are contained in separate tracks on the scale.

6. An encoder apparatus as claimed in claim 1, in which a non-imaged representation of only the track containing the at least one reference mark falls on the reference photo detector.

7. An encoder apparatus as claimed in claim 1, in which the at least one reference mark is substantially optically uniform across its extent.

8. An encoder apparatus as claimed in claim 1, in which the at least one reference mark permits a relatively greater amount of light to reach the reference photo detector.

9. An encoder apparatus as claimed in claim 1, in which the scale's features define a plurality of separate reference marks, each defining a different reference position.

10. An encoder apparatus as claimed in claim 9, in which the light from the source interacts first with the incremental scale marks to produce a first set of diffraction orders which then interact with the at least one diffraction grating to produce further diffraction orders which recombine to produce the interference fringe at the incremental photodetector.

11. An encoder apparatus as claimed in claim 1, in which the optical power, in dioptres, of any optical component in the optical path between the light source and the reference photodetector is between −100 and 100.

12. An encoder apparatus as claimed in claim 1, in which the light from the source interacts with the incremental scale marks and the at least one diffraction grating to produce an interference fringe at the incremental photodetector which changes with relative movement of the scale and readhead.

13. An encoder apparatus as claimed in claim 1, in which the light source comprises a divergent light source.

14. An encoder apparatus as claimed in claim 1, wherein the optical arrangement of the encoder is configured such that a shadow or shadow-like representation of the reference mark track falls on the reference photodetector.

15. An encoder apparatus comprising:
a reflective scale comprising scale features in at least one track which define a series of incremental scale marks and at least one reference mark;
a readhead comprising a light source, a diffraction grating, an incremental photodetector and a reference photodetector comprising at least two detector channels, the features defining the at least one reference mark being configured such that each of the at least two detector channels resolve the at least one reference mark as a single feature, wherein:

the encoder apparatus is configured such that light from the source interacts with the incremental scale marks and the diffraction grating to produce diffraction orders which combine to produce at the incremental photodetector a resultant field which varies with relative movement of the scale and readhead, and the optical arrangement of the encoder is configured such that a non-imaged representation of at least the track in which the at least one reference mark is contained falls onto the reference photodetector.

16. An encoder apparatus comprising:
a scale comprising scale features in at least one track which define a series of incremental scale marks and at least one reference mark;
a readhead comprising a light source, a diffraction grating, an incremental photodetector and a reference photodetector comprising at least two detector channels, the features defining the at least one reference mark being configured such that each of the at least two detector channels resolve the at least one reference mark as a single feature, wherein:

the encoder apparatus is configured such that light from the source interacts with the incremental scale marks and the diffraction grating to produce diffraction orders which combine to produce at the incremental photodetector an interference fringe which varies with relative movement of the scale and readhead, and the optical arrangement of the encoder is configured such that a non-imaged representation of at least the track in which the at least one reference mark is contained falls onto the reference photodetector.

17. An encoder apparatus comprising:
a reflective scale comprising scale features in at least one track which define a series of incremental scale marks and at least one reference mark;
a readhead comprising a light source, a diffraction grating, an incremental photodetector and a reference photodetector comprising at least two detector channels, the features defining the at least one reference mark being configured such that each of the at least two detector channels resolve the at least one reference mark as a single feature, wherein:

the encoder apparatus is configured such that light from the source interacts with the incremental scale marks and the diffraction grating to produce diffraction orders which combine to produce at the incremental photodetector a resultant field which varies with relative movement of the scale and readhead, and the light source comprises one or more light emission components and in which the optical power (in dioptres, $m^{-1}$) of all optical components in the optical path between the one or more light emission components and the reference photodetector is between −100 and 100.

18. An encoder apparatus as claimed in claim 17, in which no lens is provided in the optical path between the one or more light emission components and the reference photodetector.

* * * * *